(12) United States Patent
Choi et al.

(10) Patent No.: US 12,359,967 B2
(45) Date of Patent: Jul. 15, 2025

(54) DEPLOYABLE MICRO-SPECTROMETER BULLETS

(71) Applicant: Space Age Technologies, LLC, Poquoson, VA (US)

(72) Inventors: Sang H. Choi, Poquoson, VA (US); Robert W. Moses, Poquoson, VA (US)

(73) Assignee: SPACE AGE TECHNOLOGIES, LLC., Poquoson, VA (US)

( * ) Notice: Subject to any disclaimer, the term of this patent is extended or adjusted under 35 U.S.C. 154(b) by 176 days.

(21) Appl. No.: 18/299,601

(22) Filed: Apr. 12, 2023

(65) Prior Publication Data

US 2023/0324224 A1 Oct. 12, 2023

Related U.S. Application Data

(60) Provisional application No. 63/330,000, filed on Apr. 12, 2022.

(51) Int. Cl.
*G01J 3/10* (2006.01)
*F41B 11/80* (2013.01)
(Continued)

(52) U.S. Cl.
CPC ............. *G01J 3/0291* (2013.01); *F41B 11/80* (2013.01); *G01J 3/0208* (2013.01);
(Continued)

(58) Field of Classification Search
CPC ...... G01J 3/0291; G01J 3/0208; G01J 3/0229; G01J 3/10; G01J 3/2823
See application file for complete search history.

(56) References Cited

U.S. PATENT DOCUMENTS 7,379,231 B2   5/2008  Park et al.
8,015,815 B2  11/2011  Pelletier et al.
(Continued)

OTHER PUBLICATIONS

Sang H. Choi, Robert W. Moses, "Implementation Concept of Operation for a Multi-Purpose Cassegrain Solar Concentrator, Micro-Spectrometers, and Electrostatic Neutralizers to Enable In Situ Construction Activities plus Lunar, Planetary, and Deep Space Science Exploration on the Moon", Oct. 2020 (Year: 2020).*

(Continued)

*Primary Examiner* — Maurice C Smith
(74) *Attorney, Agent, or Firm* — STAAS & HALSEY LLP

(57) ABSTRACT

A tiny and portable micro-spectrometer deployable in a bullet-like form that is inexpensive to the point that it can even be disposable is described. The device is based on the micro-spectrometer that uses the Fresnel diffraction principle that allows a tiny implementation with a nanometer resolving power of spectral signal. A bullet-like micro-spectrometer has an integration of a super capacitor as a power source, a charging coil for the super capacitor, an LED or laser diode light source and driver, an analog to digital converter (ADC) circuit, and a telemetry system with antenna string. An LED or laser diode runs in a burst mode to generate deep or vacuum UV to excite target material. When the excited state of target material undergoes a singlet or triplet transition, this transition process yields fluorescence or luminescence which is a material-dependent. The micro-spectrometer senses and uses this spectral emission from material to identify the spectral signature of the targeted material. The data is converted by an ADC and transmitted to a receiving station.

5 Claims, 9 Drawing Sheets

(51) Int. Cl.
  *G01J 3/02* (2006.01)
  *G01J 3/28* (2006.01)
  *G01J 3/44* (2006.01)

(52) U.S. Cl.
  CPC .......... *G01J 3/0229* (2013.01); *G01J 3/0256* (2013.01); *G01J 3/0283* (2013.01); *G01J 3/10* (2013.01); *G01J 3/2823* (2013.01); *G01J 3/4406* (2013.01)

(56) References Cited

U.S. PATENT DOCUMENTS

| | | |
|---|---|---|
| 8,059,273 B2 | 11/2011 | Park et al. |
| 8,089,677 B2 | 1/2012 | Park et al. |
| 8,094,306 B2 | 1/2012 | Park et al. |
| 8,174,695 B2 | 5/2012 | Choi et al. |
| 8,294,989 B2 | 10/2012 | Park et al. |
| 2006/0174692 A1 | 8/2006 | Bonne et al. |
| 2017/0018843 A1 | 1/2017 | Kourti et al. |

OTHER PUBLICATIONS

Oinam Manganleiba Meetei, "Super capacitor based energy saving LED lighting system", hereafter Dec. 2016 (Year: 2016).*

Matthew Heiskell, "Spektrum Smart Telemetry Explained and Demonstrated" https://www.youtube.com/watch?v=VxkJlsykArE, May 3, 2021 (Year: 2021).*

Yeonjoon Park, John D. Wright, Jared D. L. Jensen, Glen C. King, and Sang H. Choi, "Diffraction Analysis for Periodic Nano-scale Apertures, Scatterers and Absorbers", IOP Journal, Measurement Science and Technology, 16, pp. 2208-2212, 2005.

Yeonjoon Park, Laura Koch, SangJoon Park, Glen C. King, Kyo D. Song, and Sang H. Choi, "Miniaturization of a Fresnel Spectrometer", Journal of Optics A: Pure and Applied Optics, vol. 10, (2008), 095301, doi: 10.1088/1464-4258/10/9/095301.

Yeonjoon Park and Sang H. Choi, "Miniaturization of Optical Spectroscopes into Fresnel Micro Spectrometer", Commemorative paper, Journal of Nanophotonics, vol. 7, 077599, 2013.

Sang H. Choi, et al., "Implementation Concept of Operation for a Multi-Purpose Cassegrain Solar Concentrator, Micro-Spectrometers, and Electrostatic Neutralizers to Enable In Situ Construction Activities plus Lunar, Planetary, and Deep Space Science Exploration on the Moon", Research center, Hampton, Virginia, Oct. 2020.

International Search Report issued International Application PCT/US2023/018383 dated Oct. 2, 2023.

IPRP (PCT/IB/373) (Oct. 8, 2024) and the Written Opinion of ISA (PCT/ISA/237) issued in counterpart International Application No. PCT/US2023/018383 on Oct. 2, 2023 (5 pages).

PCT/US23/018383, Apr. 12, 2023, Sang H. Choi et al., Space Age Technologies.

* cited by examiner

DEPLOYABLE MICRO-SPECTROMETER BULLETS

CROSS-REFERENCE TO RELATED APPLICATIONS

This application claims the benefit of U.S. Provisional Application No. 63/330,000, filed Apr. 12, 2022, the contents of which is incorporated herein by reference in its entirety.

FIELD

The invention generally relates micro-spectrometers, which measure the spectra of microscopic samples for analysis. More specifically, the invention relates to micro-spectrometers integrated into bullet-shaped implementations that can be deployed in places that may be difficult for standard equipment to reach.

BACKGROUND

Spectrometers are instrumentation designed to analyze spectral distribution of light. When unknown materials are exposed to incident photons of light, the exposed materials undergo quantum transitions to various levels of excited states but inverse transition processes are immediately followed to the ground states by emanating photons equivalent to the quanta of absorption. The absorption (or absorption cross-section) or excitation level of materials is different from one to another material. Accordingly, the emission spectra pattern is regarded as a spectral signature of a specific material. The analysis of emission spectra from an unknown material by spectrometers determines the kind of materials. Traditionally, spectrometers have been used to analyze samples with ultraviolet, visible, or infrared radiation, but modern spectrometers are not so limited. Modern spectrometers can use large portions of the electromagnetic spectrum to analyze materials.

In many applications, sample sizes for analysis can be quite small or it might be the case that it is necessary to analyze a material without causing it significant disturbance. Sample size constraints come from limitations of optical instruments, such as optical slits, gratings, reflectors, and optical multi-channel analyzers, specifically when Fraunhofer diffraction principles are adopted. To increase spectral resolution in a Fraunhofer spectrometer, high line-density of the grating and long path lengths are required. Consequently, a very small implementation of a Fraunhofer spectrometer is not possible without significant sacrifice of spectral resolution. To meet this need, micro-spectrometers were developed that can analyze very small sample sizes, often of less than a micrometer.

Spectrometry can be used to analyze soils and other surfaces to determine their compositions and suitability for various applications. At times this can be difficult, such as when the surface to be analyzed is in a relatively inaccessible location, such as a steep mountain or a deep crater.

Assays of soil composition is an essential task for exploration of the Moon, Mars, asteroids, or other bodies in outer space. It can be difficult or impossible to access the surface of these bodies directly. Thus, there is a need for a deployable micro-spectrometer that can be used to analyze remote or inaccessible surfaces or materials to determine their properties.

SUMMARY

The invention relates to a tiny and portable micro-spectrometer deployable in a bullet-like form that is inexpensive to the point that it can even be disposable. The device is based on the micro-spectrometer that uses the Fresnel diffraction principle that allows a tiny implementation with a nanometer resolving power of spectral signal. A bullet-like micro-spectrometer has an integration of a super capacitor as a power source, a charging coil for the super capacitor, an LED or laser diode light source and driver, an analog to digital converter (ADC) circuit, and a telemetry system with antenna string. An LED or laser diode runs in a burst mode to generate deep or vacuum UV to excite target material. When the excited state of target material undergoes a singlet or triplet transition, this transition process yields fluorescence or luminescence which is a material-dependent. The micro-spectrometer senses and uses this spectral emission from material to identify the spectral signature of the targeted material. The data is converted by an ADC and transmitted to a receiving station.

BRIEF DESCRIPTION OF DRAWINGS

These and other aspects and advantages will become more apparent and more readily appreciated from the following description of the examples, taken in conjunction with the accompanying drawings of which.

DETAILED DESCRIPTION

Figure 1:
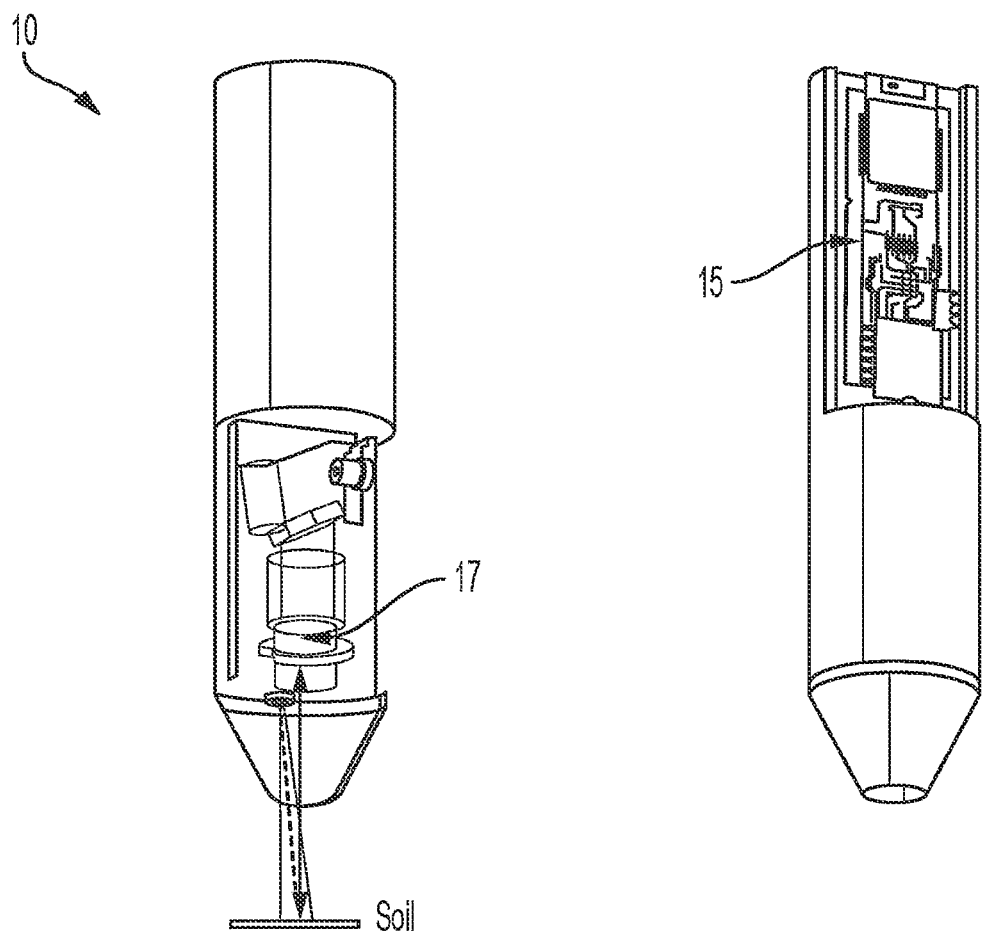
FIG. 1 is a bullet-sized micro-spectrometer according to the present invention.

Reference will now be made in detail to examples of an invention, the examples being illustrated in the accompanying drawings. In this regard, the examples may have different forms and should not be construed as being limited to the descriptions set forth herein. In order to further clearly describe features of the examples, descriptions of other features that are well known to one of ordinary skill in the art may be omitted here.

The words "a," "an" and "the" are intended to include plural forms of elements unless specifically referenced as a single element. The term "at least" preceding a listing of elements denotes any one or any combination of the elements in the listing. In other words, the expression "at least one of . . . " when preceding a list of elements, modifies the entire list of elements and does not modify the individual elements of the list.

The term of "and/or" includes a plurality of combinations of relevant items or any one item among a plurality of relevant items.

The terms "comprise(ing)," "include(ing)," and "have(ing)" when used in this specification, specify the presence of stated features, functions, processes/operations, elements, and/or components, but do not preclude the presence or addition of one or more other features, functions, processes/operations, elements, components, and/or groups thereof.

In the specification, when an element is "coupled" to another element, the elements may not only be "directly connected", but may also be "connected" via another element therebetween. The "coupling" may be mechanical, electrical, optical and/or by way of data communication. Also, when a region "includes" an element, the region may further include another element instead of excluding the other element, unless otherwise differently stated.

To overcome the size limitations of Fraunhofer spectrometers, the present invention relates to a spectrometer device based on the Fresnel diffraction principle that allows miniaturization for smaller implementations without losing spectral resolution. The spectral analysis of a small sample requires only a small amount of photon energy to become excited; the flux density of the emission spectra is also small.

The invention relates to a bullet-shaped implementation integrated with micro-spectrometers, which have nanometer resolving power of spectral signals, which may be shot by astronauts or others in remote areas or inaccessible locations, or can be utilized by rovers, satellites, or on shoes or cane stick. The nose of the micro-spectrometer can penetrate into soil to spectrally identify the components of soil, such as water, He-3, or other minerals. The signals of soil assay data are transmitted wirelessly to a receiving station through telemetry system. The deployable micro-spectrometer bullet consists of micro-spectrometer optics with a burst-mode LED UV light source, a super-capacitor with control electronics, and telemetry electronics.

The UV light has reasonably sufficient photon energy to excite target material. The material which is excited undergoes a quantum transition to the ground state. In this transition, the photons are emitted. The transition can be either as a singlet or triplet transition. The emission spectra from singlet transition is usually fluorescent while luminescent from triplet transition. For micro-spectrometer, it takes either fluorescent light or luminescent light to discern the element or chemical compound.

The emission spectra such as fluorescent or luminescent is regarded as a spectral signature of material. For the material to another material, the emission spectra are different. The micro-spectrometer needs a high energy photon light source to excite the target material, such as ultraviolet light from the burst mode of light emitting diode (LED).

The assay of Lunar, Martian, or asteroid soils can help identify bio-signatures, water, and minerals using spectral responses of chemical components in soil through a spectrometer. Most of conventional spectrometers are based on the Fraunhofer diffraction principle, which requires a long spectral path-length and high line density of grating for high resolution. Such spectrometers are too bulky and heavy for space applications. The deployable bullet-like micro-spectrometer is based on the Fresnel diffraction principle which allows miniaturization for very tiny and lightweight embodiment such as a bullet-like.

The invention relates to a tiny and portable micro-spectrometer deployable in a bullet-like form that is inexpensive to the point that it can even be disposable. The device is based on the micro-spectrometer that uses the Fresnel diffraction principle that allows a tiny implementation with a nanometer resolving power of spectral signal. A bullet-like micro-spectrometer has an integration of a super capacitor as a power source, a charging coil for the super capacitor, an LED or laser diode light source and driver, an analog to digital converter (ADC) circuit, and a telemetry system with antenna string. An LED or laser diode runs in a burst mode to generate deep or vacuum UV to excite target material. When the excited state of target material undergoes a singlet or triplet transition, this transition process yields fluorescence or luminescence which is a material-dependent. The micro-spectrometer senses and uses this spectral emission from material to identify the spectral signature of the targeted material. The data is converted by an ADC and transmitted to a receiving station.

The applications of the device described herein are so extensive that it can be used to assay the soil composition of Lunar, Martian, and asteroids, to detect the toxic chemicals in battlefield, to detect non-hygienic elements during food processing, to monitor thin-film process, and others.

FIG. 1 shows a bullet-like micro-spectrometer 10 according to the present invention. The micro-spectrometer 10 includes a super-capacitor 15 with control and telemetry electronics and a portion that includes the micro-spectrometer optics 17. The length of the micro-spectrometer is generally less than about 3 inches and the width is generally less than about 1 inch in diameter.

Figure 2:
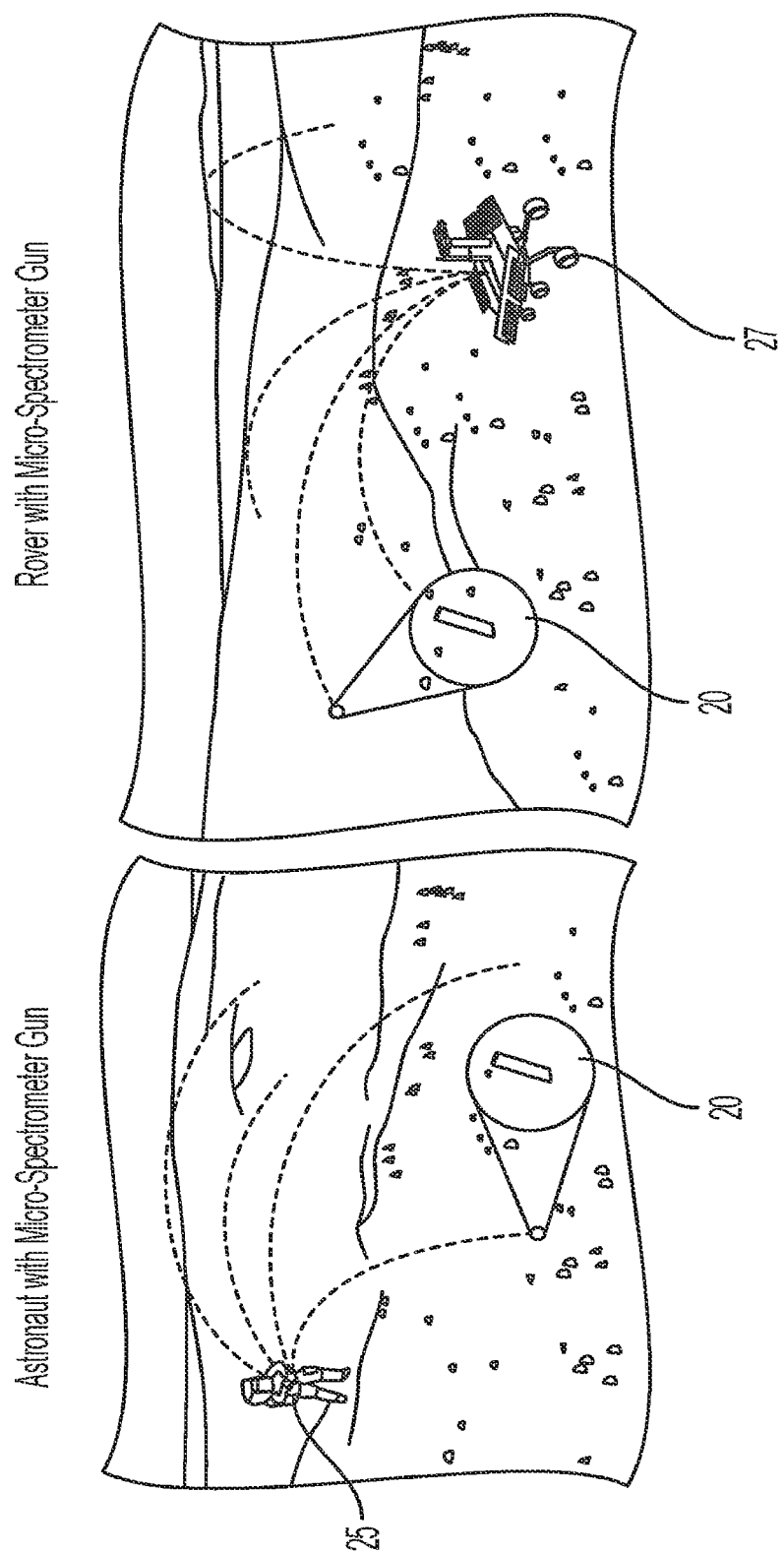
FIG. 2 is a view of an astronaut with a micro-spectrometer gun and a rover with a micro-spectrometer gun for deploying the bullet-sized micro-spectrometer as shown in FIG. 1.

FIG. 2 shows one of the applications for the deployable micro-spectrometer as a bullet 20. Multiple micro-spectrometer bullets (MSB) can be dispensed in series or simultaneously for broad-area mineral assay as shown in FIG. 2. The MSB may be deployed by an astronaut-held gas gun 25 or a rover platform 27, as shown in FIG. 2. Other deployments may include or mortar shell or self-propelled by a tiny rocket attached at the rear end of micro-spectrometer. The devices can also be deployed from a hovering spacecraft, hopper, or an orbiting satellite, allowing a wider area and a deeper penetration for soil composition assays at lower depths.

Figure 3:
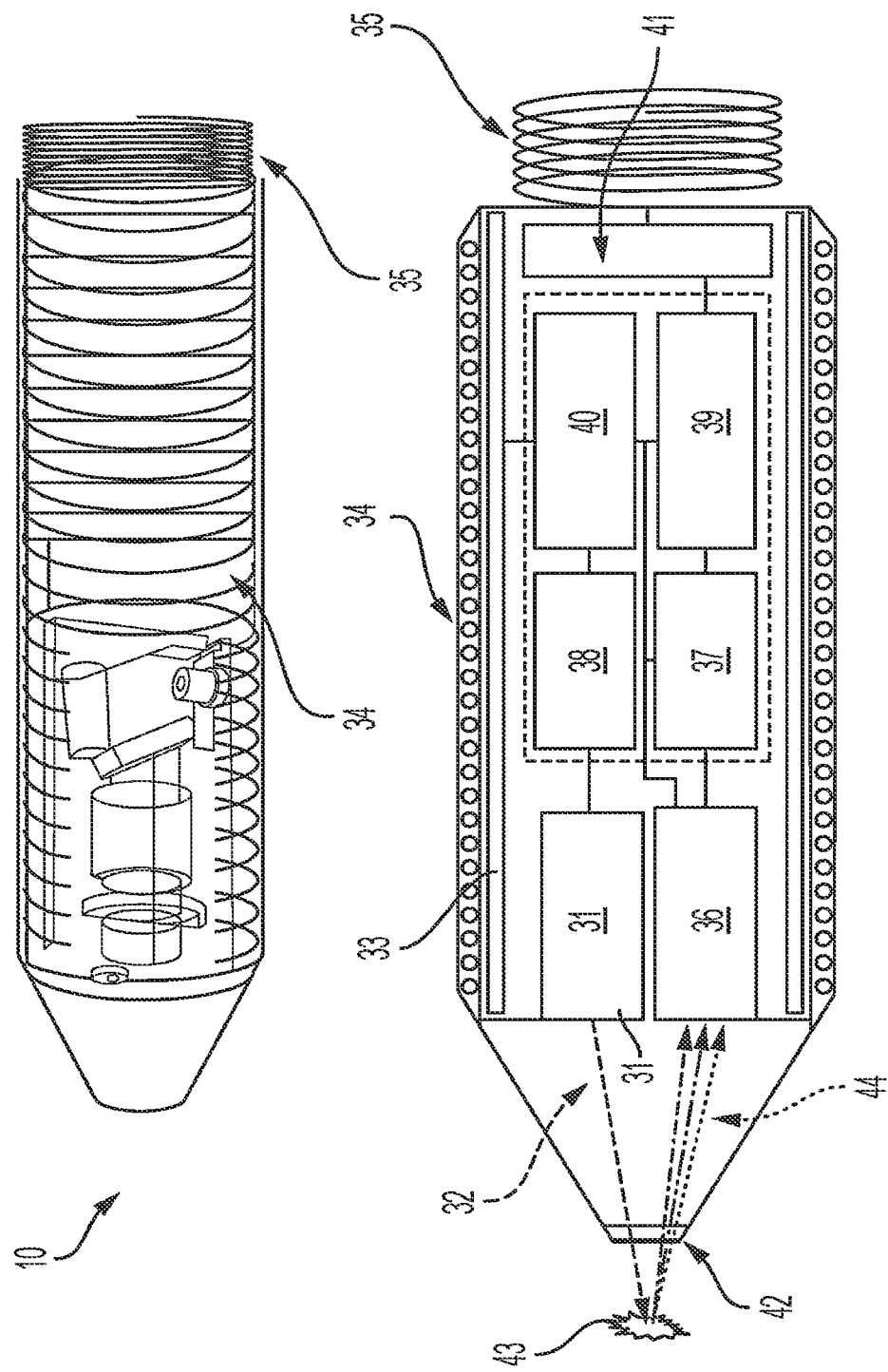
FIG. 3 is a cross-section view of a bullet-sized micro-spectrometer as shown in FIG. 1.

FIG. 3 shows the components of the micro-spectrometer of FIG. 1. The micro-spectrometer 10 includes a burst-mode LED UV or laser diode light source 31 that produces a laser or LED light 32. The device also includes a super-capacitor 33, control electronics, and telemetry electronics. The "Optics/sensing unit" 36 may include several different modes based on the signal injection pattern, a parallel injection 45, or a vertical injection 47, as shown in FIG. 4. The optics/sensing unit 36 includes a beam collimator 92, a dichroic filter 93, a linear differential grating 94, and a CMOS image sensor 95, as well as other components that are not shown. The power needed for operation of the micro-spectrometer bullet 10 is released by a discharging circuit of a super-capacitor 33. Super-capacitor 33 is charged by a charging coil 34 that crosses a magnetic field 75 whenever a micro-spectrometer bullet 10 with a charging coil 34 is shot out and passes through the barrel 71. When laser diode or burst mode of LED 31 driven by LD or LED driver circuit 38 using the regulated over-voltage 40 from the power released from super-capacitor 33 emits a short pulse of intense ultra-violet light 32 towards the target 43, the impingement of the UV light excited the material in target 43 through the rotational, vibrational, electronic, or a combination of quantum transitions. After the pulse of UV light 32 impinged the material in target 43, the excited material relaxes and undergoes an inverse transition to the ground state by emitting either fluorescence or luminescence 44. The emission spectra of the fluorescence or luminescence 44 from the excited material in target 43 passes through the optical window 42 and continuously propagates through a beam collimator 92 and a dichroic filter 93. Eventually, the transmitted spectra passes through a linear differential grating 94 and are spectrally dispersed and fall onto the image plane of a CMOS image sensor 95 of which pixels have their own addresses based on the line components of the spectra. The pixel data are digitized by an analog-to-digital converter (ADC) 37. The digitized data are formed a as a carrier bus by microcontroller 39 for transmission through a telemetry system 41 and its own stretchable antenna 35.

Figure 4A:
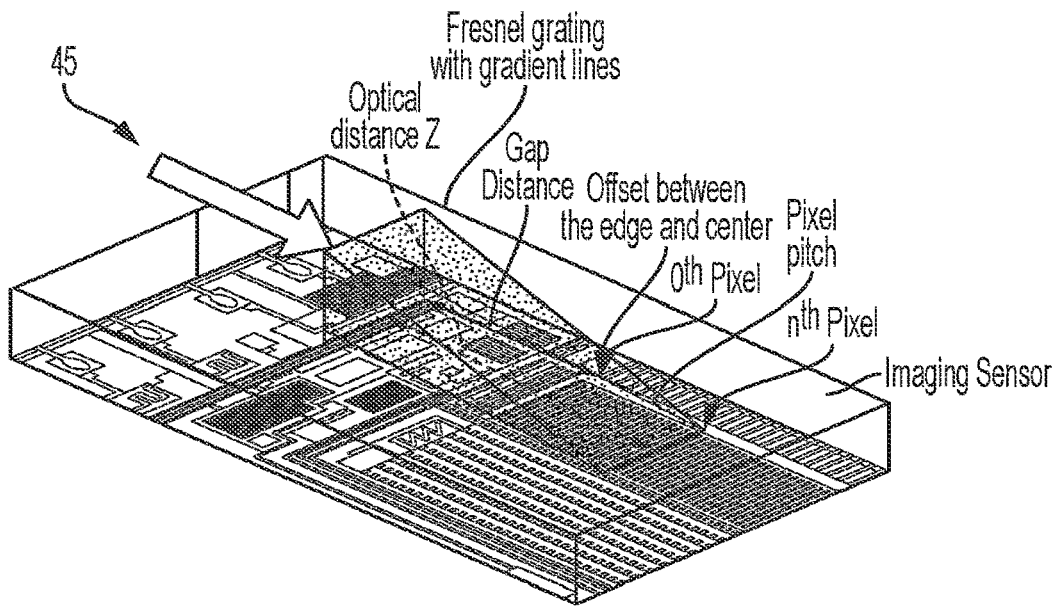
FIG. 4A shows micro-spectrometer chip models including parallel injection.
Figure 4B:
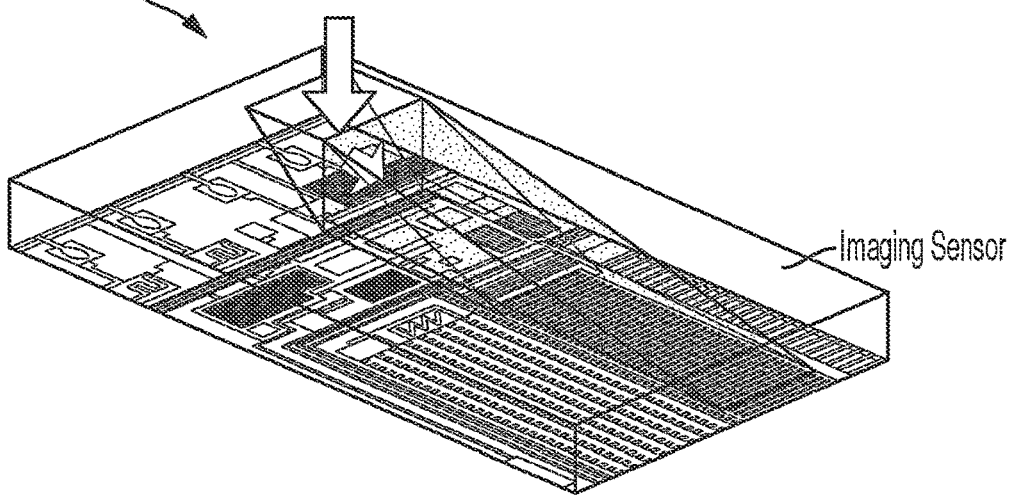
FIG. 4B shows micro-spectrometer chip models including vertical injection patterns.
Figure 4C:
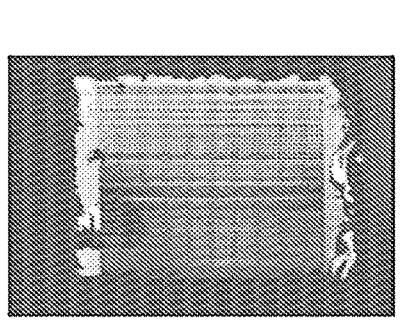
FIG. 4C shows micro-spectrometer chip models including linear differential Fresnel grating.
Figure 4D:
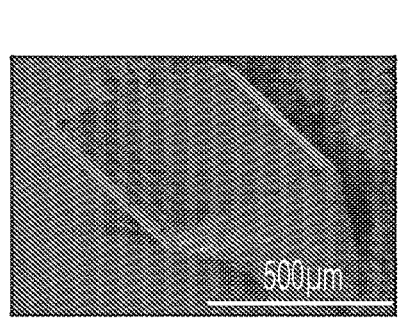
FIG. 4D shows micro-spectrometer chip models including right angle prism linear differential Fresnel grating.

FIG. 4 shows chip models for the micro-spectrometer, as either parallel injection mode cell 45 in FIG. 4A with a linear Fresnel grating 46 (FIG. 4C) or a vertical injection mode cell 47 in FIG. 4B with a right angle prism linear differential Fresnel grating 48 (FIG. 4D). No matter its injection orientation, the spectral signal 44 from target material 43 after impinging on and passing through the differential linear Fresnel grating, either 46 in FIG. 4C or 48 in FIG. 4D, will shine onto the pixel array of the imaging sensor. In this process, the photons of the spectral signal of fluorescence or luminescence 44 from target material 43 are diffracted through Fresnel grating and then fall onto a specific pixel according to the wavelength of spectral signal because the diffraction through the Fresnel grating of spectral signal is wavelength (or photon energy) dependent. A vertical injection mode cell 47 is very practical when the spectral signal 44 is brought through the sidewall of bullet micro-spectrometer 10, instead of through the leading edge of bullet micro-spectrometer 10. Even when it is embedded into an earth drill bit, a vertical injection mode 47 is much more useful than the parallel injection mode 45.

Figure 5:
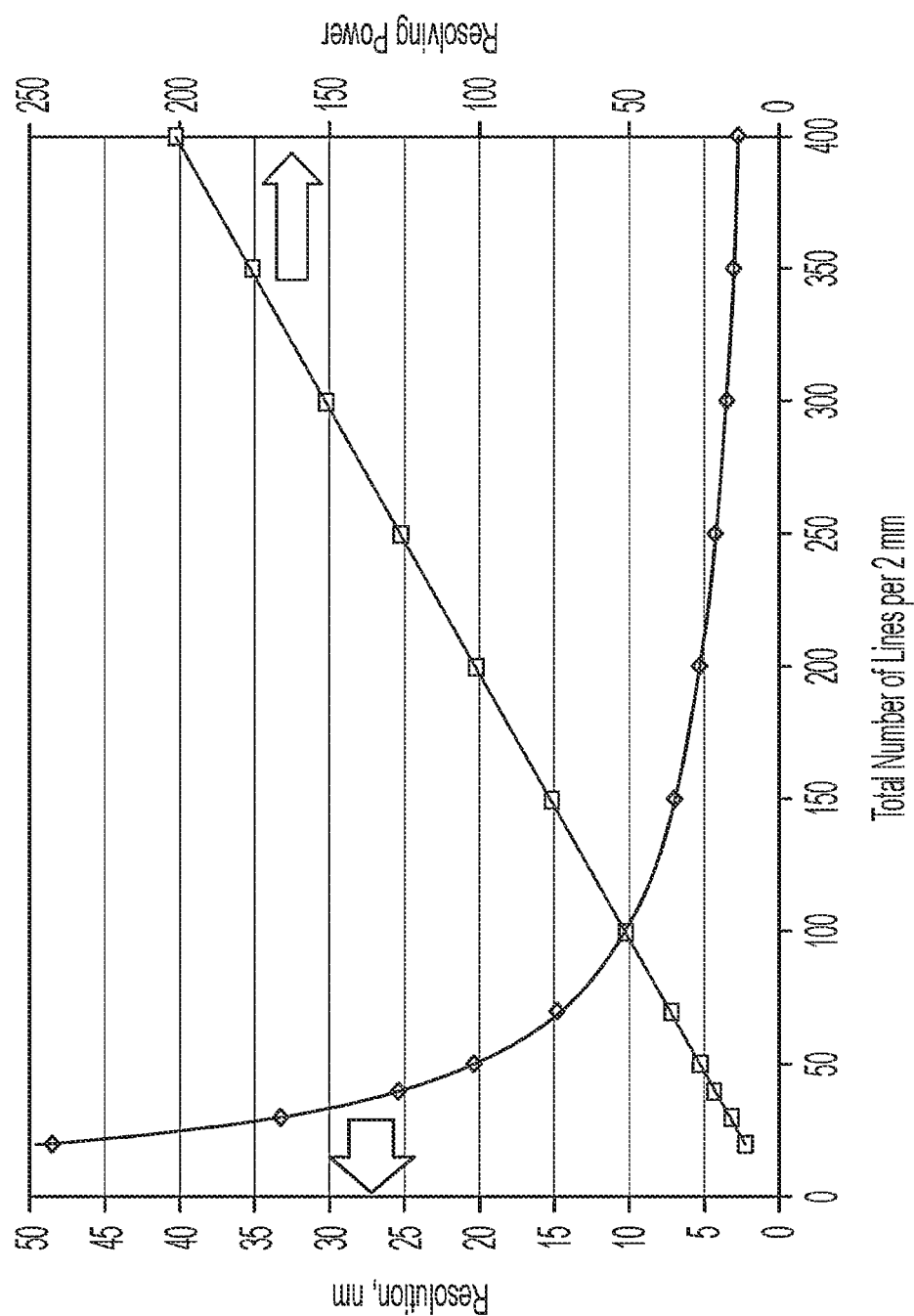
FIG. 5 is a graph demonstrating the resolution and resolving power of differential Fresnel grating based on the total number of lines per 2 mm height.

To differentiate the spectral lines further for distinguishing one spectral line from another even after diffraction, a high pixel density of the image sensor is required to receive the specified wavelength of the incoming signal 44 as shown in FIG. 5. That is, a high resolution Fresnel grating requires a high pixel density sensor to separate spectral lines to identify different components of the soil. The spectral data obtained by addressable pixel element is digitized through the ADC converter 37 and micro-controller 39. Then the telemetry unit 41 transmits the digitized data to a receiving station where the data are collected and processed for image construction of mineral map or to show the distribution of other necessary search elements. FIG. 5 shows the resolution and resolving power-based line number density of grating (2 mm size) of differential linear Fresnel grating. For example, a grating with 200 lines/mm offers 2.5 nm resolution and 200 scale level resolving power. For example, the fabricated line number densities of gratings 46, 48 shown in FIG. 4 are far exceeding 200 lines/mm.

Once a bullet-like micro-spectrometer is shot out as a projectile, it flies a trajectory path to reach a target surface and penetrates by its momentum into the regolith soil. At the moment of penetration, a burst-mode LED or a laser diode 31 is automatically turned on by an impact switch to generate a pulse of intensive deep UV (DUV), which has a photon energy of about 6 to 10 eV or vacuum UV (VUV) light 32, which has a photon energy of about 10 to 20 eV. A burst-mode LED or a laser diode 31 is powered by the super-capacitor 33 that stores energy. The DUV or VUV 32 from a burst-mode LED or a laser diode 31 in a pulse mode illuminates and excites the target soil component 43 to create a singlet or triplet transition according to the amount of absorbed photon energy. Since the pattern of optical absorption and associated quantum transition that emanates fluorescent or luminescent emission 44 varies from the element or molecular structure of material, these transitions are often used to identify the spectral signature of materials.

Figure 6:
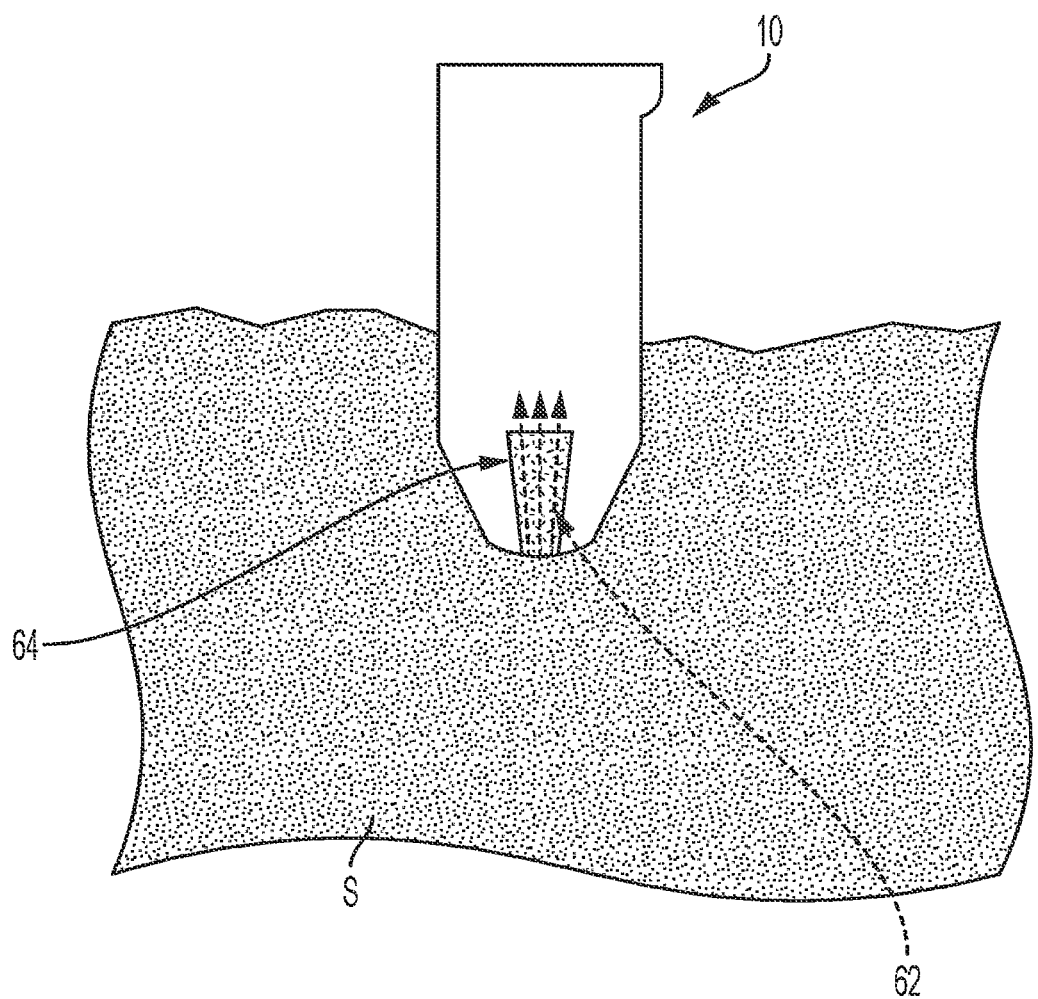
FIG. 6 shows a micro-spectrometer bullet as shown in FIG. 1 that is penetrated into soil.

FIG. 6 shows a micro-spectrometer bullet 10 that is penetrated into soil S. As explained above, the fluorescence or luminescence 44 of emission spectra 62 from the excited soil S component is the spectral signal picked up by a sensor array, digitized, and transmitted wirelessly through an onboard telemetry system and antenna at a receiving station. The data logger and analyzer at a receiving station analyze the transmitted data from the bullet-like micro-spectrometer 10 to illustrate spectrally the resolved signature of chemicals. FIG. 6 shows a pulse mode of injection spectra DUV or VUV 64. It is preferable to have high pulse mode photon energy, such as VUV, because it carries more energy for exciting the material in target 43, which generates more intense fluorescence than luminescence. In a sensing device, the measurability of fluorescence is done more easily than luminescence.

Figure 7:
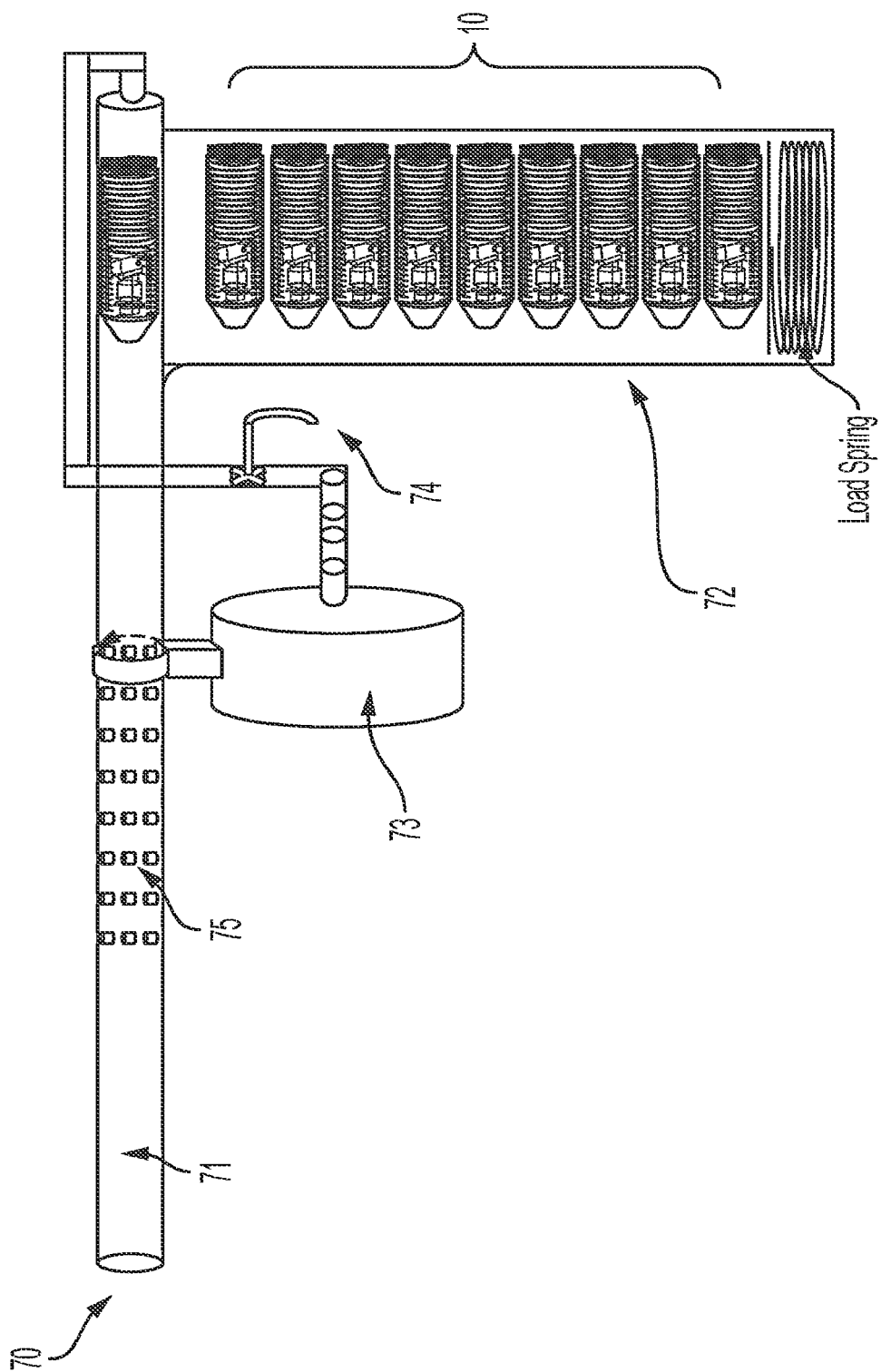
FIG. 7 shows a compressed gas gun for shooting the micro-spectrometer bullets as shown in FIG. 1.

FIG. 7 shows a compressed gas dispenser 70. When a micro-spectrometer bullet (MSB) 10 from the magazine 72 is loaded into a shooting position, the compressed gas 73 is released by trigger-opening the valve (gas release trigger). When the valve is opened, the compressed gas 73 expands and pushes a readied MSB 10 through the barrel 71. The MSB 10 passed through the array of magnets positioned circumferentially 75 on the barrel 71 where a charge coil 34 generates an electric current to charge the super capacitor 33 of MSB 10 and accelerate the MSB 10 out the gun barrel 71. FIG. 7 shows a plurality of MSB 10 in a spring loaded magazine 72. As each MSB 10 is shot and dispensed, the next one is automatically loaded for the next shot. When a MSB 10 is shot, a tiny solid propellant rocket attached to the rear end of MSB 10 alleviates the use of a compressed gas dispenser 70 with compressed gas storage 73. In FIG. 7, however, a compressed gas dispenser 70 is shown for safety purposes. In this system, when a MSB 10 is loaded, compressed gas 73 is released by a gas release trigger 74 to push the loaded MSB 10 through the barrel 71 where a magnetic field is formed by the array of circumferentially arranged magnets 75. When a charging coil 34 of MSB 10 runs and cuts through the magnetic field, the charging coil 34 generates electricity that is then stored in super-capacitor 33. Thus, the compressed gas disperser 70 not only shoots MSB 10, but also provides necessary power for operation of MSB 10 to the landing site.

Figure 8:
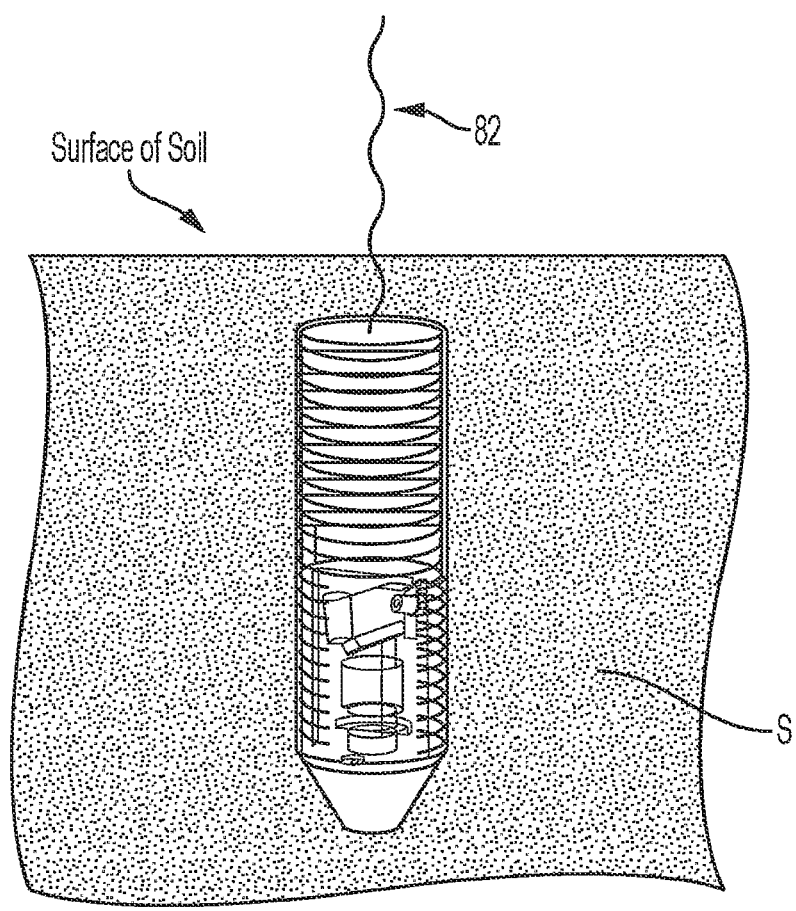
FIG. 8 shows a micro-spectrometer bullet further penetrated within soil as shown in FIG. 6, having an antenna string.

When the MSB 10 leaves the end of barrel 71, the antenna coil 35 of MSB 10 is stretched and straightened by its momentum distribution and own stretching force of spring. In such a way, as the MSB 10 lands on powdered soft soil and pokes deep into soil, the stretched antenna coil 82 can still appear above the soil and communicate with a receiving station as shown in FIG. 8.

Other shooting method includes a mortar-shell which has gun-powder at the tail of MSB 10. In this case when a MSB 10 is loaded, the gun-powder is ignited to propel the MSB through magnetic field of gun barrel. Otherwise, the rest of device concept and process is the same as that of compressed gas propelled MSB described above.

Another deployment method includes a pencil rocket connected at the tail of MSB 10. In this case when a MSB 10 is loaded, a pencil rocket is ignited to accelerate the MSB 10 through the magnetic field within barrel. Otherwise, the rest of device concept and process is the same as that of compressed gas propelled MSB 10.

Figure 9:
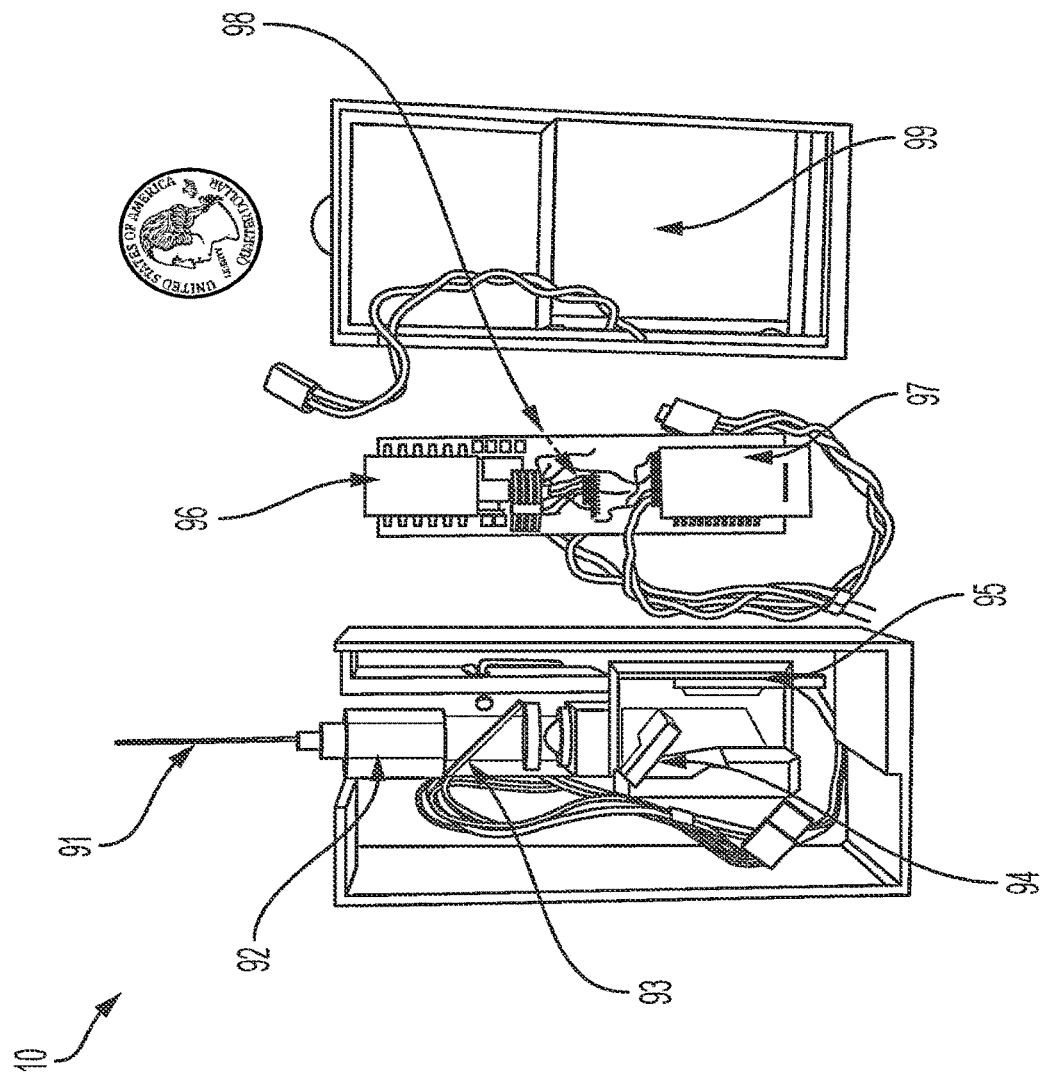
FIG. 9 is an internal view of the bullet-sized micro-spectrometer as shown in FIG. 1.

FIG. 9 shows a model bullet micro-spectrometer 10 opened to show the various components. The bullet micro-spectrometer 10 includes a sensing probe 91, a beam collimator 92, a dichroic filter 93, a linear grating 94, a CMOS image sensor 95, a laser diode driver 96, a Bluetooth module 97, a microcontroller 98, and a battery 99. The sensing probe in the model is a quartz rod to channel UV light 32 to the target 43 and guide emitted light 44 into a beam collimator 92. The beam collimator 92 straightens and leads the emitted spectrum through a sensing probe 91 into a dichroic filter 93 for selective transmission of incoming spectra. Dichroic filter 93 provides an option to specifically target spectrum measurements of MSB 10. For example, MSB 10 with a dichroic filter 93 may select for the spectrum of water or the spectrum of He-3 or the spectrum of titanium oxide. The spectral component that is filtered through dichroic filter 93 passes through linear differential grating 94 to spread the spectrum further to split the spectrum line-by-line. The split spectra lines fall onto the pixel plane of CMOS image sensor 95. In this example, a laser diode 31 with a driver circuit 96, a Bluetooth module 97 for wireless data transmission, and a battery were used for quick performance. The digitized data are formed as a data carrier bus by microcontroller 39 for transmission through a telemetry system 41 and its own stretchable antenna 35.

The many features and advantages of the described examples may be apparent from the detailed description and, thus, it is intended by the appended claims to cover all such features and advantages of the described examples that fall within the true spirit and scope thereof. Further, since numerous modifications and changes will readily occur to those skilled in the art, it is not desired to limit the examples to the exact construction and operation illustrated and described, and accordingly all suitable modifications and equivalents may be resorted to, falling within the scope thereof.

The invention claimed is:

1. A bullet micro-spectrometer comprising:
    a super capacitor configured to be chargeable and dischargeable for supplying power;
    a charging/discharging mode selection circuit configured to charge and discharge the super capacitor;
    a burst-mode light emitting diode (LED) ultraviolet (UV) light source or a laser diode light source that produce ultraviolet light;
    driving control electronics configured to control the ultraviolet light emitted by the burst-mode LED UV light source or the laser diode light source for burst mode emission of deep or vacuum ultraviolet light;
    telemetry electronics configured to collect and transmit digitized spectral data; and
    a stretchable wire antenna through which the digitized spectral data are transmitted, configured to be deployed as a projectile from a gun, as a mortar shell, as a self-propelled rocket, as a projectile from a rover vehicle, as a projectile from a satellite, from a bottom of a shoe, or from an axial end of a stick.

2. The bullet micro-spectrometer of claim 1, further comprising:
    a sensing probe for the burst mode emission to a target to be excited;
    a beam collimator configured to receive emission spectra from the sensing probe and to form a straightened and aligned spectral signal;
    a dichroic filter configured to filter LED light and stray light away in order to inject a spectral signal from the target excited;
    a linear differential grating configured to spread and split the emission spectra from the dichroic filter to form spectral lines;
    a CMOS image sensor configured to receive the spectral lines on high pixel density;
    a Bluetooth or wireless data transmission module configured to transmit data;
    a microcontroller configured to read the spectral lines for delivery in form of the digitized spectral data to the telemetry electronics for transmission through the Bluetooth or wireless transmission module; and
    a power management circuit configured to control power input and output among components of the bullet micro-spectrometer.

3. A bullet micro-spectrometer delivery system comprising:
    a magazine that includes a plurality of bullet micro-spectrometers;
    a compressed gas dispenser that includes gas under pressure for dispensing the plurality of bullet micro-spectrometers;
    a trigger-opening valve to release compressed gas from the compressed gas dispenser;
    a barrel through which the plurality of bullet micro-spectrometers are released when the compressed gas is released from the compressed gas dispenser;
    a super capacitor that is charged while the plurality of bullet micro-spectrometers are released through the barrel; and
    a plurality of magnets positioned circumferentially around the barrel that charge the super capacitor.

4. The bullet micro-spectrometer delivery system of claim 3, wherein a bullet micro-spectrometer of the plurality of bullet micro-spectrometers includes an antenna coil configured to stretch and straighten as the bullet micro-spectrometer passes through the barrel.

5. The bullet micro-spectrometer delivery system of claim 4, wherein the antenna coil includes telemetry circuitry that collects, digitizes, and transmits spectral data collected by the bullet micro-spectrometer to a mother station.

* * * * *